(12) United States Patent
Lin

(10) Patent No.: US 8,366,516 B2
(45) Date of Patent: Feb. 5, 2013

(54) PARTIAL-AREA POLISHING DEVICE FOR OPTICAL DISC

(76) Inventor: Ming-Sheng Lin, Feng Shan (TW)

( * ) Notice: Subject to any disclaimer, the term of this patent is extended or adjusted under 35 U.S.C. 154(b) by 598 days.

(21) Appl. No.: 12/621,453

(22) Filed: Nov. 18, 2009

(65) Prior Publication Data

US 2011/0117825 A1 May 19, 2011

(51) Int. Cl.
*B24B 5/00* (2006.01)
(52) U.S. Cl. ......... 451/287; 451/288; 451/290; 451/359
(58) Field of Classification Search ............ 451/63, 451/285–290, 359
See application file for complete search history.

(56) References Cited

U.S. PATENT DOCUMENTS

| | | | | |
|---|---|---|---|---|
| 4,489,521 A * | 12/1984 | Mazur | ............ | 451/324 |
| 4,561,142 A * | 12/1985 | Mischenko et al. | ............ | 15/97.1 |
| 4,709,437 A * | 12/1987 | Hehn et al. | ............ | 15/97.1 |
| 4,713,856 A * | 12/1987 | Clausen | ............ | 15/97.1 |
| 5,102,099 A * | 4/1992 | Brown et al. | ............ | 451/283 |
| 5,938,510 A * | 8/1999 | Takahashi et al. | ............ | 451/290 |
| 5,963,526 A * | 10/1999 | Lee | ............ | 369/72 |
| 6,116,987 A * | 9/2000 | Kubo | ............ | 451/41 |
| 6,261,159 B1 * | 7/2001 | Krieg et al. | ............ | 451/63 |
| 6,386,946 B1 * | 5/2002 | Lin et al. | ............ | 451/7 |
| 6,590,847 B2 * | 7/2003 | Weng | ............ | 369/72 |
| 6,846,228 B2 * | 1/2005 | Lin | ............ | 451/290 |
| 2004/0029504 A1 * | 2/2004 | Lin | ............ | 451/290 |

* cited by examiner

Primary Examiner — Maurina Rachuba
(74) Attorney, Agent, or Firm — Leong C. Lei

(57) ABSTRACT

An optical disc polishing device includes a housing in which a disc turntable assembly is arranged for carrying an optical disc on a rotation surface thereof. The housing includes a cover that carries a polishing assembly. The cover forms a slot serving as a track extending in a radial direction of the optical disc. The polishing assembly includes a positioning member, a polishing wheel, and a locking knob. A threaded section is provided on the positioning member and the polishing wheel is coupled to the positioning member to be opposite to the threaded section. The threaded section is set through the track slot to threadingly engage the locking knob in a releasable and re-tightenable manner so as to allow for position adjustment of the polishing assembly with respect to the track slot. The polishing assembly can thus be positionable to oppose a scratch formed on the disc.

2 Claims, 4 Drawing Sheets

PARTIAL-AREA POLISHING DEVICE FOR OPTICAL DISC

TECHNICAL FIELD OF THE INVENTION

The present invention generally relates to a partial-area polishing device for optic discs, and more particularly to an optic disc polishing device comprising a polishing assembly that is position adjustable to correspond to a local area of a surface of the disc to be polished so as to allow for polishing carried on the local area and thus shortening the time interval required for the polishing operation.

DESCRIPTION OF THE PRIOR ART

An optical disc comprises a circular substrate having a surface that is coated with a metal film for recording data therein. A polycarbonate coating is further applied to the metal film for protection of the data recorded in the metal film. An optical disc reader accesses the data recorded in the metal film from an opposite surface of the circular substrate. Thus, the optical disc, when put into operation, is frequently accessed by the reader and is prone to be scratched and thus damaged. The number of scratches on the surface of the circular substrates increases with the frequency of data accessing and the increased amount of scratches eventually causes problems in accessing data recorded in the disc. Users will be troubled by such problems.

To overcome such problems, disc repair devices are available in the market. The conventional disk repair devices comprise at least one polishing wheel that is positionable on the surface of the circular substrate of an optical disc. Relative movement is caused between the optical disc and the polishing wheel when the disc is put into rotation. The relative movement causes abrasion that polishes the surface of the circular substrate to remove the scratches and thus repairing the damaged disc. However, the polishing wheel of the conventional disc repairing device is often set at a fixed position by being mounted to a housing or a cover of the repairing device, whereby polishing of the surface of the optical disc cannot be carried out on a particular local area of the disc surface. As a result, removal of the scratches on a disc surface must be effected through performance of polishing on the whole disc surface and extension of the time interval in which the polishing operation must be performed. In case that scratches formed on a disc surface are of different depths, the shallow scratches can be removed with one polishing operation, but the scratches of some great depth may require two or more times of polishing operation. The time needed for completely removing the scratches will be greatly extended and wearing of the optical disc is increased. Thus, it is desired to have an optical disc polishing device that eliminates the above discussed problems.

SUMMARY OF THE INVENTION

In view of the above discussion, the present invention aims to provide an optical disc polishing device that effectively eliminates the problems of the conventional disc repairing devices.

The present invention provides a partial-area polishing device for optical discs, which allows for adjustment of position of a polishing wheel so as to selectively locate the polishing wheel at a site corresponding to a local area of a disc surface where surface polishing for removal of scratches or other damages is desired.

To achieve the above objective, the technical solution adopted in the present invention comprises an optical disc polishing device, which comprises a housing in which a disc turntable assembly is arranged for carrying an optical disc on a rotation surface thereof. The housing comprises a cover that carries a polishing assembly that is adjustable in position thereof. The cover forms a slot serving as a track extending in a radial direction of the optical disc. The polishing assembly comprises a positioning member, a polishing wheel, and a locking knob. A threaded section is provided on the positioning member and the polishing wheel is coupled to the positioning member to be opposite to the threaded section. The threaded section is set through the track slot to threadingly engage the locking knob in a releasable and re-tightenable manner so as to allow for position adjustment of the polishing assembly with respect to the track slot.

The polishing wheel is mounted to the positioning member in such a way that when the cover is closed, the polishing wheel is positioned against a surface of the optical disc that is positioned on the turntable.

As such, the polishing assembly is selectively movable to a location exactly corresponding to a specific local site of a disc surface where scratches to be removed are formed, whereby the polishing operation can be performed in an efficient manner by being applied to the specific local site only so that the time needed for the polishing operation is shortened and the polishing performance can be improved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
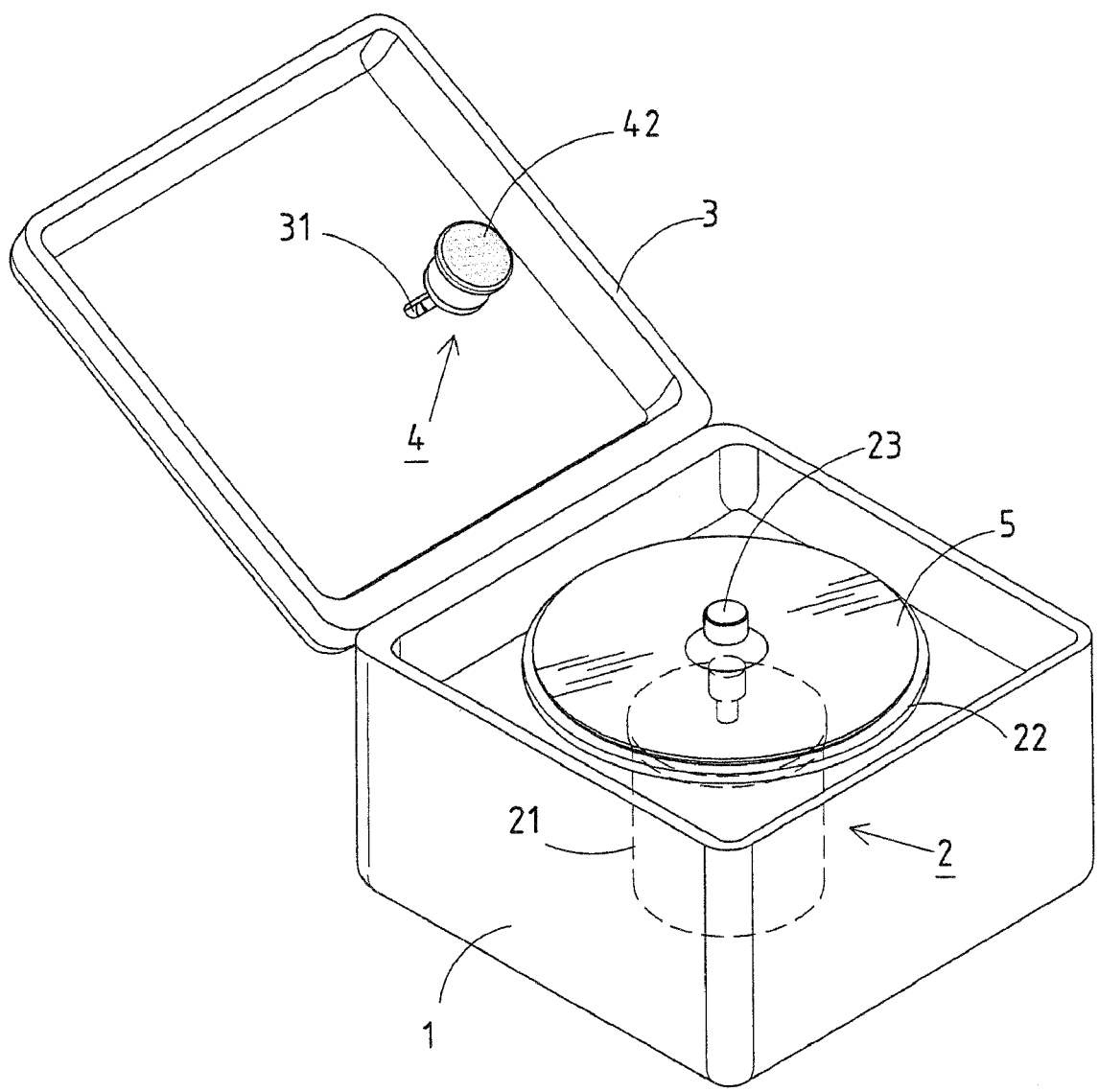
FIG. 1 is a perspective view showing an optical disc polishing device in accordance with the present invention in a cover opened condition.
Figure 2:
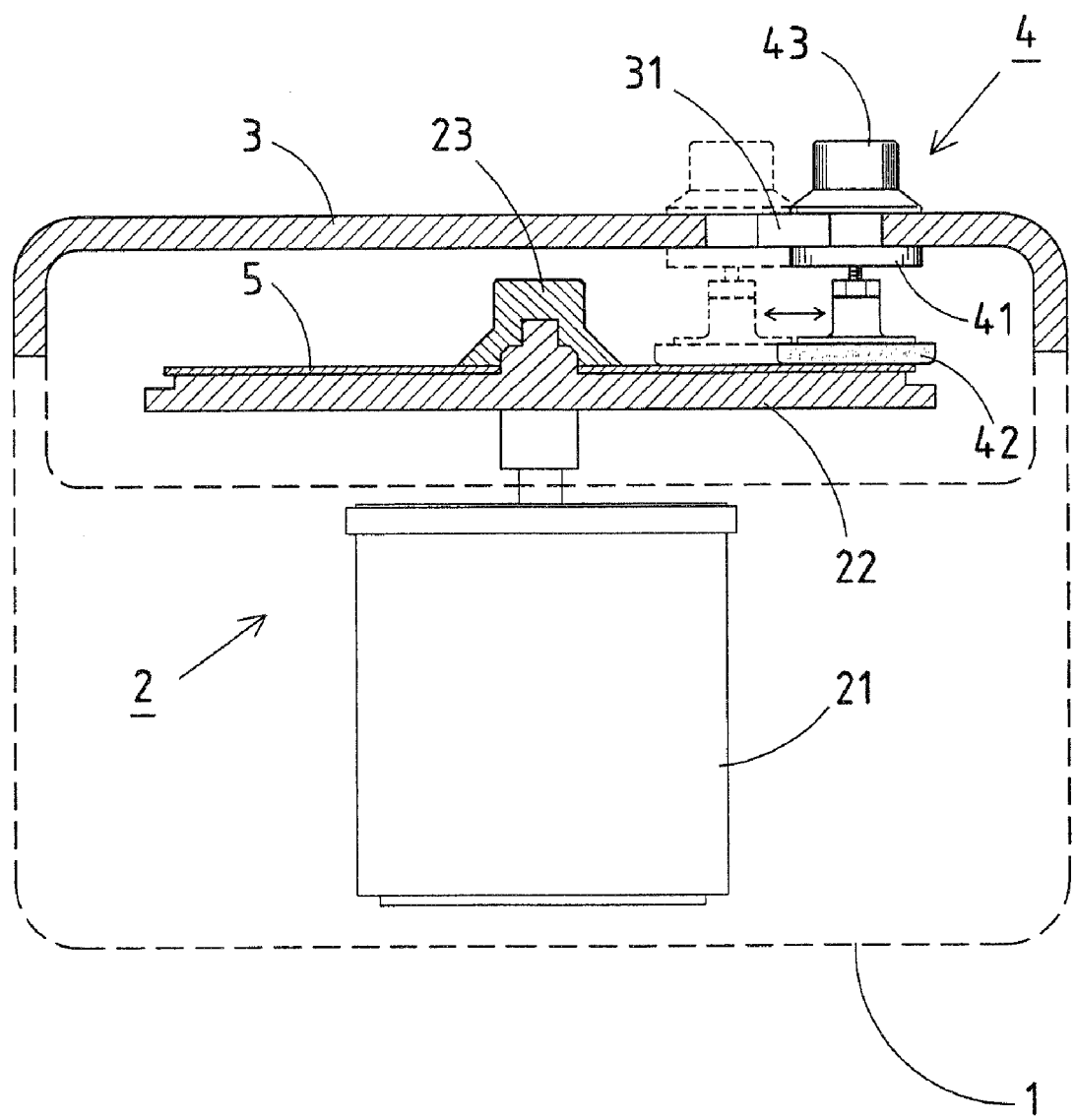
FIG. 2 is a cross-sectional view of the optical disc polishing device of the present invention in a cover closed condition.

With reference to the drawings and in particular FIGS. 1 and 2, which show an optical disc polishing device constructed in accordance with a preferred embodiment of the present invention for removing scratches or damages from a surface of an optical disc, the polishing device of the present invention comprises a housing 1 and a disc turntable assembly 2 arranged inside the housing 1. The housing 1 is provided with a cover 3 that carries thereon a position-adjustable polishing assembly 4.

The disc turntable assembly 2 comprises a motor 21, which comprises a rotation spindle (not labeled), and a turntable 22 mounted to an end of the spindle of the motor 21 to be rotated by the motor spindle. The turntable 22 provides a surface on which an optical disc 5 is positionable whereby the optical disc 5 is rotatable in unison with the turntable 22.

Figure 3:
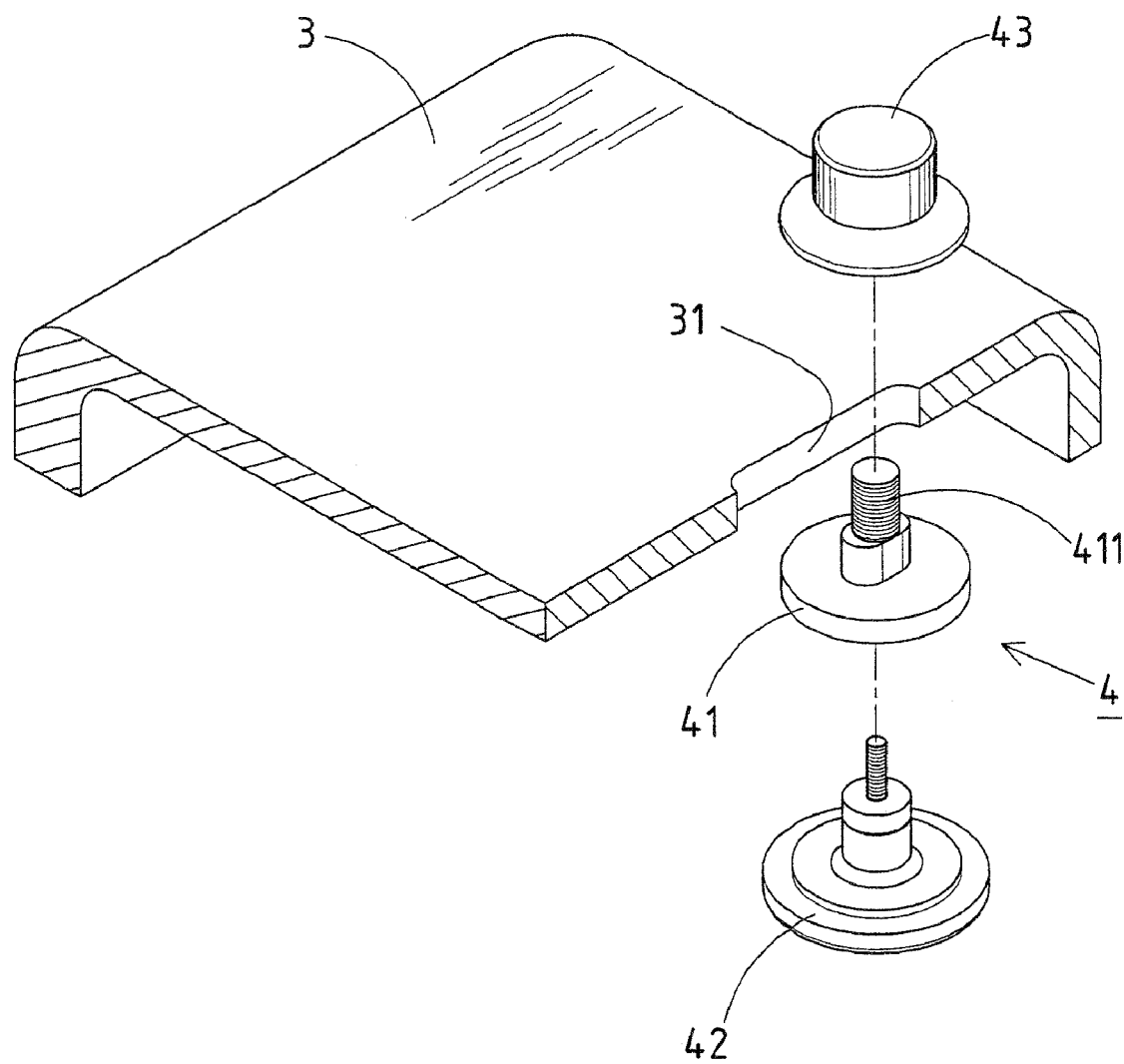
FIG. 3 is an exploded view of a position-adjustable polishing assembly of the optic disc polishing device of the present invention.

The cover 3 is pivotally coupled to the housing 1 and is rotatable for opening/closing. The cover 3 defines a slot 31 that opposes the surface of the turntable 22 (or the optical disc 5, if any, positioned on the turntable 22) and extends in a radial direction with respect to a rotation center of the turntable 22 to serve as a track to which the polishing assembly 4 is mounted and is movable therealong for position adjustment. As shown in FIG. 3, the polishing assembly 4 comprises a positioning member 41, a polishing wheel 42, and a locking knob 43. A threaded section 411 is formed or otherwise provided on the positioning member 41. The polishing wheel 42 is coupled to the positioning member 41 in any known manner, and preferably in a rotatable and/or removable manner, so that the polishing wheel 42 and the threaded section 411 are opposite to each other with respect to the positioning member 41. The threaded section 411 of the positioning member 41 is set through the track slot 41 and engages an inner thread (not shown) of the locking knob 43 so as to couple the polishing assembly 4 to the track slot 31 in a position adjustable manner, whereby the polishing assembly 4 can be set at any desired location along the track slot 31 by selectively releasing and re-tightening the locking knob 43. The polishing wheel 42 is mounted to the positioning member 41 to be distant from the cover 3 in such a way that when the cover 3 is closed, the polishing wheel 42 is positioned against a surface of the optical disc 5 that is positioned on the turntable 22.

Figure 4:
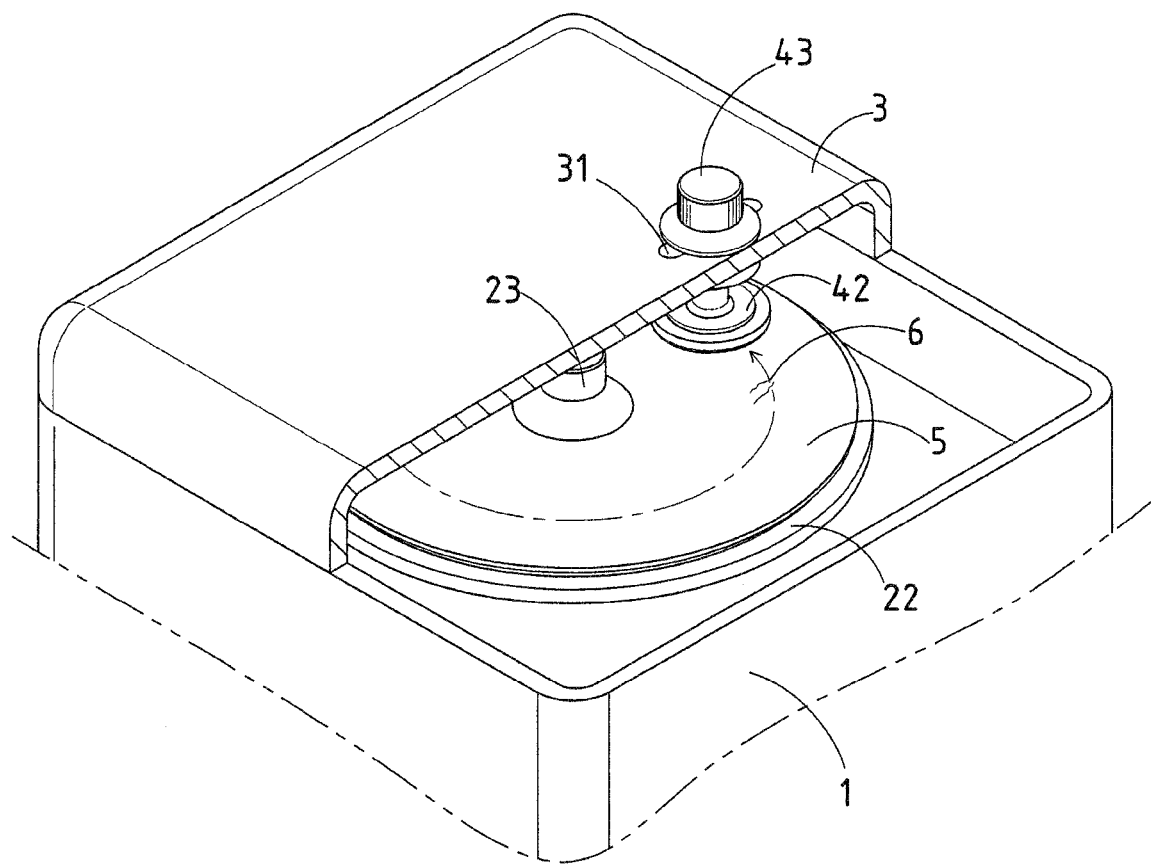
FIG. 4 is a perspective view of the optical disc polishing device of the present invention, a cover of the optical disc polishing device being partially broken to illustrate a polishing operation applied by the polishing assembly to a surface of an optical disc.

With such an arrangement, to practice polishing of a partial area of a surface of an optical disc where local scratches occur on the disc surface, the disc polishing device of the present invention allows for moving of the polishing assembly 4 along the track slot 31 and thus re-positioning of the polishing assembly 4 to a site corresponding to and opposing a scratch 6 on the surface of the optical disc 5, as shown in FIG. 4. Since the polishing operation is carried out only for the local area where the scratch occurs, the time interval required for the polishing operation is shortened, as compared to the conventional disc scratch removing device, and thus an improved performance of polishing and scratch removal can be achieved.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A disc polishing device, comprising a housing and a disc turntable assembly arranged inside the housing and coupled to a motor through a spindle that selectively drives a turntable to rotate, the turntable having a rotation surface that is adapted to carry an optical disc thereon to have the optical disc rotate with the rotation surface, the housing comprising a cover that carries a polishing assembly, characterized in that:

the cover forms a slot serving as a track extending in a radial direction of the optical disc; and the polishing assembly comprises a positioning member, a polishing wheel, and a locking knob, wherein a threaded section is provided on the positioning member and the polishing wheel is coupled to the positioning member to be opposite to the threaded section, the threaded section being set through the track slot to threadingly engage the locking knob in a releasable and re-tightenable manner so as to allow for position adjustment of the polishing assembly with respect to the track slot so as to set the polishing wheel of the polishing assembly at a location corresponding to a partial area of the optical disk on which a scratch is formed, whereby the polishing assembly selectively polishes the partial area of the optical disc where the scratch is formed in order to remove scratch.

2. The disc polishing device according to claim 1, wherein the polishing wheel is mounted to the positioning member in such a way that when the cover is closed, the polishing wheel is positioned against a surface of the optical disc that is positioned on the turntable.

* * * * *